(12) United States Patent
Zhu et al.

(10) Patent No.: US 8,725,919 B1
(45) Date of Patent: May 13, 2014

(54) DEVICE CONFIGURATION FOR MULTIPROCESSOR SYSTEMS

(75) Inventors: Julianne J. Zhu, Los Gatos, CA (US);
David T. Hass, Santa Clara, CA (US)

(73) Assignee: Netlogic Microsystems, Inc., Irvine, CA (US)

( * ) Notice: Subject to any disclaimer, the term of this patent is extended or adjusted under 35 U.S.C. 154(b) by 132 days.

(21) Appl. No.: 13/164,319

(22) Filed: Jun. 20, 2011

(51) Int. Cl.
*G06F 13/00* (2006.01)
(52) U.S. Cl.
USPC ............................ 710/104; 710/313; 710/315
(58) Field of Classification Search
USPC ............ 710/8–10, 15, 16, 104, 313, 315, 110
See application file for complete search history.

(56) References Cited

U.S. PATENT DOCUMENTS

| | | | |
|---|---|---|---|
| 2002/0016877 A1* | 2/2002 | Porterfield | 710/100 |
| 2006/0272015 A1* | 11/2006 | Frank et al. | 726/15 |
| 2008/0016405 A1* | 1/2008 | Kitahara | 714/43 |
| 2008/0137676 A1* | 6/2008 | Boyd et al. | 370/419 |
| 2008/0209099 A1* | 8/2008 | Kloeppner et al. | 710/314 |
| 2008/0288661 A1* | 11/2008 | Galles | 710/3 |
| 2009/0077297 A1* | 3/2009 | Zhao et al. | 710/314 |
| 2011/0106981 A1* | 5/2011 | Watkins et al. | 710/9 |
| 2011/0119423 A1* | 5/2011 | Kishore et al. | 710/302 |

OTHER PUBLICATIONS

*PCI Express Base Specification Revision* 2.1, PCI-SIG, pp. 1-704, Mar. 4, 2009.
*PCI Local Bus Specification Revision* 2.2, PCI Special Interest Group, pp. i-xx and 1-302, Dec. 18, 1998.

* cited by examiner

*Primary Examiner* — Glenn A Auve
(74) *Attorney, Agent, or Firm* — Sterne, Kessler, Goldstein & Fox PLLC

(57) ABSTRACT

Disclosed is an approach for configuring devices for a multiprocessor system, where the devices pertaining to the different processors are viewed as connecting to a standardized common bus. Regardless of the specific processor to which a device is directly connected, that device can be generally identified and accessed along the standardized common bus. PCIe is an example of a suitable standardized bus type that can be employed, where the devices for each processor node are represented as PCIe devices. Therefore, each of the devices would appear to the system software as a PCIe device. A PCIe controller can then be used to access the device by referring to the appropriate device identifier. This permits any device to be accessed on any of the processor nodes, without separate and individualized configurations or drivers for each separate processor node.

35 Claims, 6 Drawing Sheets

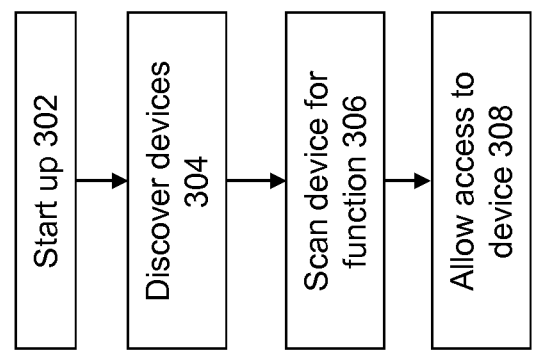

Fig. 4

| Function | Type | Class Code | Description |
|---|---|---|---|
| Function 0 | 0 | 0680000h: Host bridge | Bridge-DRAM Controller |
| Function 1 | 0 | 0680000h: Other bridge device | Coherent Interchip Port 0 |
| Function 2 | 0 | 0680000h: Other bridge device | Coherent Interchip Port 1 |
| Function 3 | 0 | 0680000h: Other bridge device | Coherent Interchip Port 2 |
| Function 4 | 0 | FF0000h: Undefined PCI device | PIC: Programmable Interrupt Controller |
| *Bus0:Device 1/9:1:7/25* | | | |
| Function 0 | 2/0 | 0604000h/FF0000h: PCI-to-PCI bridge/Undefined device | PCIE Root Port 0/Endpoint Port |
| Function 1 | 1 | 0604000h: PCI-to-PCI bridge | PCIE Root Port 1 |
| Function 2 | 1 | 0604000h: PCI-to-PCI bridge | PCIE Root Port 2 |
| Function 3 | 1 | 0604000h: PCI-to-PCI bridge | PCIE Root Port 3 |
| *Bus0:Device 2/10:16/26* | | | |
| Function 0 | 0 | 0C0320h/0C03FEh: USB EHCI/USB Device | USB EHCI Device Controller |
| Function 1 | 0 | 0C0310h: USB OHCI | USB OHCI Controller 0 |
| Function 2 | 0 | 0C0310h: USB OHCI | USB OHCI Controller 1 |
| *Bus0:Device 3/11:19/27* | | | |
| Function 0 | 0 | 0280000h: Other network controller | NET: Networking Engine |
| Function 1 | 0 | 0280000h: Other network controller | POE: Packet Ordering Engine |
| *Bus0:Device 4/12:20/28* | | | |
| Function 0 | 0 | FF0000h: Undefined PCI device | MSG: Message Station |
| *Bus0:Device 5/13:21/29* | | | |
| Function 0 | 0 | FF0000h: Undefined PCI device | GDX: DMA Engine |
| Function 1 | 0 | FF0000h: Undefined PCI device | SEC: Security Engine |
| Function 2 | 0 | 1000050h: Network and computing en/decryption | CMP: Compression/Decompression Engine |
| *Bus0:Device 6/14:22/30* | | | |
| Function 0 | 0 | FF0000h: Undefined PCI device | GIO: UART0 |
| Function 1 | 0 | FF0000h: Undefined PCI device | GIO: UART 1 |
| Function 2 | 0 | FF0000h: Undefined PCI device | GIO: I2C 0 |
| Function 3 | 0 | FF0000h: Undefined PCI device | GIO: I2C 1 |
| Function 4 | 0 | FF0000h: Undefined PCI device | GIO: GPIO |
| Function 5 | 0 | FF0000h: Undefined PCI device | GIO: Power Management |
| Function 6 | 0 | FF0000h: Undefined PCI device | GIO: JTAG |
| *Bus0:Device 7/15:23/31* | | | |
| Function 0 | 0 | 0561000h: Flash | GBU: flash |

DEVICE CONFIGURATION FOR MULTIPROCESSOR SYSTEMS

FIELD OF THE INVENTION

The present invention relates to multiprocessor systems, and more particularly, to device configurations for multiprocessor systems.

BACKGROUND

Multiprocessor systems are systems that include multiple processors or CPUs (central processing units) that are linked together. A combination of hardware and operating-system software design considerations determines the operations that are permitted to occur in the multiprocessor system. For example, hardware or software considerations are considered to map out and execute how each of the CPUs will respond to hardware interrupts, how work in the system will be distributed among the CPUs, and/or how software code will be executed among and by the different CPUs.

Many multiprocessor systems contain multiple CPUs that have access to centrally shared resources, or participate in a scheme that shares both local and shared resources. For example, there are many different kinds of I/O devices that are supported by the different CPUs in a multiprocessor system, and many of these I/O devices have different levels of capabilities that need to be supported by the multiprocessor system. Such I/O devices may also be usable and sharable among the different processors in the multiprocessor system.

For each of the sharable and accessible devices in the system, such as I/O devices, a certain amount of configuration and setup will allow that device to be discovered and used by system software. Even in an ordinary single processor system, it is considered to be a fairly complicated task to make sure that the I/O devices are properly recognized and configured for use by the system software. This task is made even more difficult in a multiprocessor system, in which there are multiple processors and such devices that need to be properly recognized and configured are associated with the different processors in the system.

One possible approach that can be taken to address this problem is to separately write and store the drivers and configuration information for each device that pertains to each different processor in the system. The problem with this approach is that this approach necessarily requires wasteful duplication of resource to configure and store these separate copies of the configuration and driver information for the different processors, particularly if the same devices exist for the different processors. Another problem with this approach is that in some multiprocessor systems, it is desirable to use software at a master processor to start-up and control the activities of the other non-master processors. In this approach, there is a further emphasis on not duplicating such configuration and driver information on each of the processors.

Therefore, there is a need for an improvised approach to implement device configuration in a multiprocessor system.

SUMMARY

An improved approach to implement device configuration in a multiprocessor system is provided in embodiments of the invention, where the devices pertaining to the different processors are viewed as connecting to standardized common bus. Regardless of the specific processor to which a device is directed connected, that device can be generally identified and accessed along the standardized common bus. PCIe is an example of a suitable standardized bus type that can be employed, where the devices for each processor node are represented as PCIe devices. Each of the attached devices appears to the system software as a PCIe device. A PCIe controller can then be used to access the device by referring to the appropriate device identifier. This permits any device to be accessed on any of the processor nodes, without requiring separate and individualized configurations or drivers for each separate processor node.

Other and additional objects, features, and advantages are described in the detailed description, figures, and claims.

BRIEF DESCRIPTION OF THE DRAWINGS

FIG. 3 shows a flowchart of an approach for configuring devices for a multiprocessor system according to some embodiments.

FIG. 4 shows a chart of device identifiers according to some embodiments.

DETAILED DESCRIPTION

Figure 1:
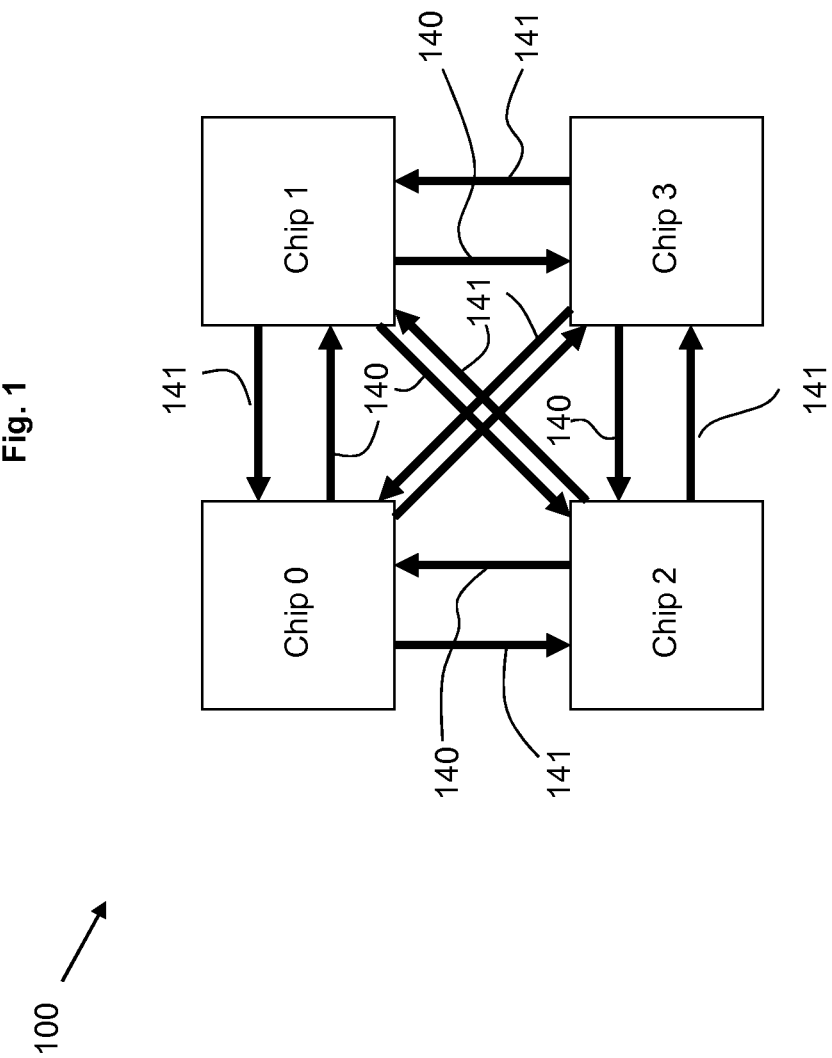
FIG. 1 illustrates an example multiprocessor system.

Embodiments will now be described in detail with respect to the drawings, which are provided as illustrative examples. Notably, the figures and examples below are not meant to limit the scope of the present disclosure to a single embodiment, but other embodiments are possible by way of interchange of some or all of described or illustrated embodiments. Whenever convenient, the same reference numbers will be used throughout the drawings to refer to the same or like parts. Where certain elements of the these embodiments can be partially or fully implemented using known components, only those portions of known components that are necessary for understanding of the embodiment will be described, and details descriptions of other portions of such known components will be omitted so as to not obscure the description of the invention. In the present specification, an embodiment showing a singular component should not be considered to be limiting; rather, the invention is intended to encompass other embodiments including a plurality of the same components, and vice versa, unless explicitly stated otherwise. Moreover, applicants do not intend to for any term in the specification or claims to be ascribed an uncommon or special meaning unless explicitly set forth as such. Further, the present embodiments encompass present and future known equivalents to the components referred to by way of illustration.

Some embodiments are directed to an improved approach for configuring devices for a multiprocessor system, where the devices pertaining to the different processors are viewed as connecting to a standardized common bus. Regardless of the specific processor to which a device is directly connected, that device can be generally identified and accessed along the standardized common bus. A common set of storage is employed to store the necessary information to utilize these devices via the common bus.

In one embodiment, the devices are configured as Peripheral Component Interconnect Express (PCIe) devices on a given processor chip. PCIe is an expansion card and interconnect bus standard that has been adopted to provide connectivity for hardware devices on a computer system. In many modern computers, the PCIe bus serves as the primary motherboard-level interconnect that connects a host system processor with both integrated peripherals and add-on peripherals/expansion cards.

The PCIe bus provides high-speed connectivity with shared address/data lines using a point-to-point topology. In the PCIe bus protocol, communications are encapsulated into packets, where the packetizing and depacketizing of data and status-message traffic is handled by the transaction layer of the PCIe port that is controlled by a PCIe controller. PCIe devices communicate via a logical connection (an interconnect or link), where the link is a point-to-point communication channel between two PCIe ports. Further details regarding the PCIe standard can be found in the *PCI Local Bus Specification Revision 2.2* and *PCI Express 2.0 Base Specification*, which are maintained by the PCI-SIG (PCI Special Interest Group) and are available at http://www.pcisig.com, both of which are hereby incorporated by reference in their entirety.

In some embodiments, the devices attached to a processor node are viewed as PCIe devices, where system software is used to scan the devices for interrupt entries to identify device dependent parameters for configuration of those discovered devices. For example, an efficient memory and Input/Output (I/O) subsystem can be implemented by representing memory and I/O devices as PCIe devices, where the system software scans the devices for interrupt entries, and the PCIe controller on the system reports interrupts detected by each link. Interrupts are signaled through a "virtual wire" of the PCIe, so that in-band messages carry interrupt information or assertion of dedicated PCIe interrupt pins.

FIG. 1 depicts an example processing system 100 having multiple processor chips/nodes 0, 1, 2, and 3 (hereinafter nodes 0, 1, 2, and 3) that are interconnected in a mesh. The processor nodes 0, 1, 2, and 3 communicate over interchip links (also referred to as interchip coherency links) 140 and 141. While there are four processors shown in system 100, it is noted that this number of processors is merely illustrative, and that the inventive concepts disclosed herein may be applied to any number of processors.

The interchip links 140 and 141("ICI") allow processor nodes 0, 1, 2, and 3 to be connected together through an interconnect mechanism. For example, each processor has three ICI interfaces for connecting to the three other devices in a 4-processor configuration. The interchip communications block of the processor nodes contains register fields that define the number (e.g., the rank or order) of each processor in the multiprocessor configuration, as well as the number of each interchip bus within a particular processor. When a request for a packet transfer is sent by a particular processor, the associated control word contains the destination node number, as well as the ICI interface number to which the destination node is attached. Hardware then routes the data to the appropriate interface.

Figure 2:
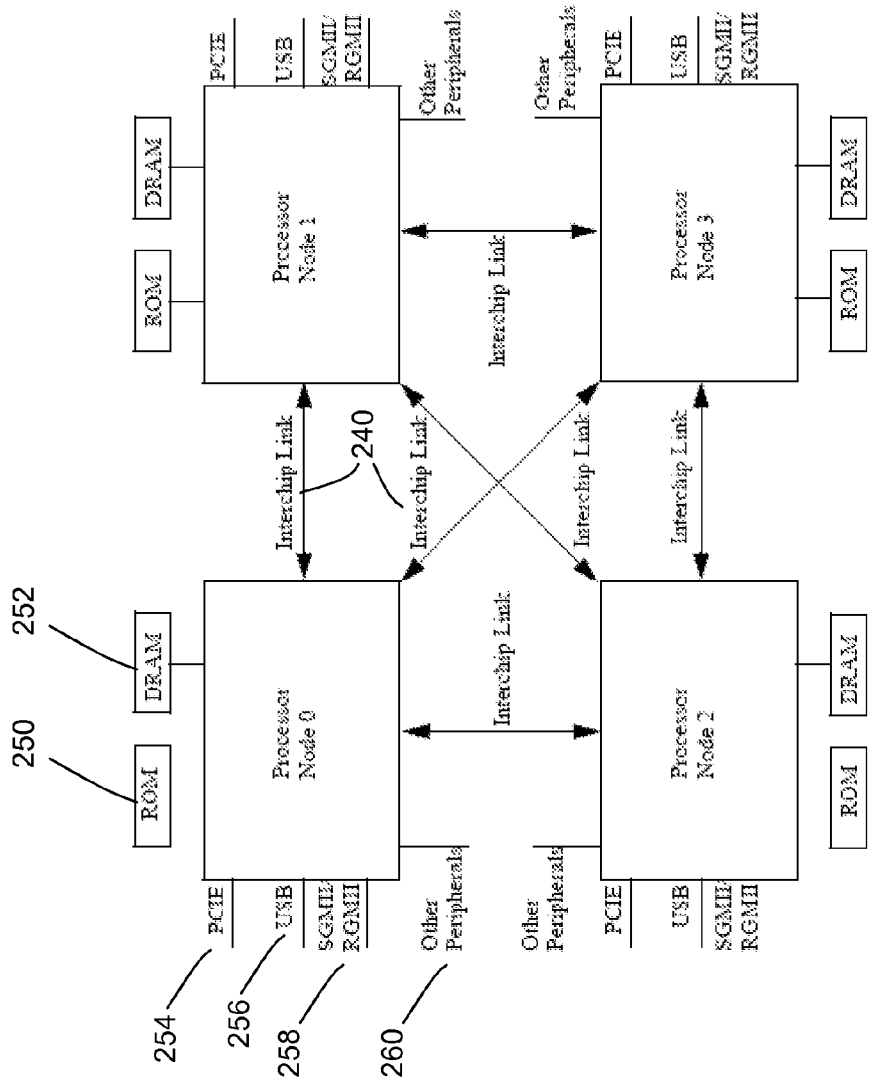
FIG. 2 illustrates the example multiprocessor system having devices associated with each processor node.

There may be any number of different devices and types of devices that are associated with the processor nodes 0, 1, 2, and 3. FIG. 2 shows a more detailed illustration of a multiprocessor system having the four processor nodes 0, 1, 2, and 3, where the processor nodes are interconnected with coherent interchip links 240. Each processor node is associated with multiple devices. In the example of FIG. 2, each processor node is associated with a ROM 250, DRAM 252, PCIe port(s) 254, USB controller(s) 256, SGMII/RGMII device(s) 258, and other peripheral 260 that may be connected to a processor node. While the current example shows an approach in which each process node is associated with the exact same configuration of devices, it is noted that the inventive concepts disclosed herein are not limited to this approach, and indeed, are applicable to multiprocessor systems where the different processors may be associated with different configurations of devices.

FIG. 3 shows a flowchart of an approach for configuring devices in a multiprocessor system (e.g., the system of FIGS. 1 and 2) according to one embodiment of the invention. At 302, the multiprocessor system is powered up. In one approach for implementing a start-up sequence, one of the processor nodes is designated as the master, and the other processor nodes are designated as slave nodes. For example, in a four nodes system, processor node 0 may be designated as the master node and processor nodes 1, 2, and 3 may be designated as the slave nodes. In some examples of this approach, the master processor node will include an onboard and/or attached memory that contains start up software while the slave nodes do not include this memory. The master node uses the software in its onboard/attached memory to engage in a boot up process. During this process, the master node will communicate across the interchip links to identify and start up each of the slave nodes.

During this start up process, the start up software will, at 304, discover each device that is attached or otherwise associated with the processor nodes. This discovery process identifies each device that is directly attached to the processor nodes. In addition, if the processor node is associated with a bridge, then the discovery process will proceed through the bridge to discover any devices on the other side of the bridge. Examples of devices that may be discovered in 304 include memory and I/O devices/controllers, such as the memory and I/O devices/controllers 250-260 shown in FIG. 2. However, this approach can be used to discover any suitably attached device, including for example, accelerators such as security and compression accelerators.

At 306, each discovered device for each processor node is scanned to identify the function of that device. If there are devices across a bridge, then those devices are also scanned to identify their functions.

The discovery process (e.g., 304 and 306) is performed to determine if a given device exists in the system. Once it is determined that the device (e.g., I/O or accelerator) exists, then information is obtained that is utilized to allow access to the device, e.g., information from PCIe registers. Such information includes, for example, an interrupt entry identifier, a bandwidth weight entry, and a message queue identifier.

The discovered devices have assigned (e.g., pre-assigned) device identifiers. Alternatively, device identifiers are assigned to each of the discovered devices. According to one embodiment, the devices are identified using a data tuple composed of (a) bus number; (b) device number; and (c) function number.

The bus number identifies the common bus on which the devices, which are all treated as PCIe devices, are resident. In the multi-processor architecture of FIG. 2, each of the devices that are shown as being attached to the processor cores will be associated with the same logical bus (e.g., "PCI Bus 0"). Since the devices are actually attached to different processor nodes, PCI Bus 0 is not a single physical bus. Instead, the internal devices on the processor chips within the multiprocessor system logically constitute PCI Bus 0. It is this view of a common logical bus that permits the software to transparently view, configure and access any of the devices in the multiprocessor system, even though those devices are physically associated with different processor nodes.

The device number portion of the device identifier specifies the specific device number for the (apparent) PCIe device. The multiprocessor system implements a PCIE Root Complex (RC) where the device internal to the processor chip maps to a PCIE Device Function on Bus0 in the RC. In some embodiments, each processor node implements up to eight (apparent) PCIE devices. Therefore, Device 0-Device 7 would correspond to the first processor node (processor node 0), Device 8-Device 15 would correspond to the second processor node (processor node 1), Device 16-Device 23 would correspond to the third processor node (processor node 2), and Device 24-Device 31 would correspond to the fourth processor node (processor node 3).

The function number is the identifier associated with the specific function of a given device. Each function for a device is tied to a specific and recognized function number. In some embodiments, the PCIe device supports 4 functions (0-3), with one function per PCIe link. Function 0 corresponds to PCIe link 0, while function 3 corresponds to PCIe link 3.

Once the devices have been discovered and their functions identified, those devices can then be accessed by the software at 308. At this point, each of those devices would appear to the system software as a PCIe device. Therefore, the PCIe controller can then be used to access the device by referring to the appropriate device identifier.

FIG. 4 shows an example chart 402 of PCIe device functions that may be implemented for a multiprocessor system. In this example chart 402, all devices are associated with the same PCI bus 0.

This chart 402 includes a column 404 to identify the function number of a given entry in the chart 402. The type column 406 identifies whether a device is an endpoint or a bridge. The Class column 408 identifies the class code for an entry, where the class code provides a defined class for a given type of device, e.g., based on PCIe standard defined classes. The description column 410 provides a brief description for each device entry in the chart 402.

Each device number is associated with a separate section of chart 402. Here, section 420 pertains to devices for the first device number for each processor node (e.g., device number 0 for node 0, device number 8 for node 1, device number 16 for node 2, and device number 24 for node 3). Similarly, section 422 pertains to devices for the second device number for each processor node, e.g., device number 1 for node 0, device number 9 for node 1, device number 17 for node 2, and device number 25 for node 3 (as shown in portion 440). This similarly continues through the rest of chart 402, where section 424 pertains to devices for the third device number for each processor node, e.g., device number 2 for node 0, device number 10 for node 1, device number 18 for node 2, and device number 26 for node 3 (as shown in portion 444). Each of the other sections 426, 428, 430, 432, and 434 pertain to the fourth, fifth, sixth, seventh, and eighth device numbers, respectively, for the processor nodes, where the specific device numbers are shown in portions 444, 446, 448, 450, and 452.

This chart 402 assumes that each of the processor nodes will include similar devices to one another. Therefore, the chart 402 can be used to refer to all of the devices for all of the processor nodes, where the same device on each processor node has the same bus number and function number, but will be associated with a different device number.

For example, assume that there is a desire to access the USB OHI Controller 0 on both processor nodes 0 and 1. Entry 460 in chart 402 contains information that can be used to refer to both of these devices. For this device on processor node 0, the device identifier would include the combination of the bus number (Bus 0), the device number for this node (device 2), and the function number (1). For this device on processor node 1, the device identifier would include the combination of the bus number (Bus 0), the device number for this node (device 10), and the function number (1). The difference in the identifier between these two devices is in the device number, where the specific device number for each node can be found in portion 442 of the chart 402.

The functions that are associated with the devices would correspond to the intended functions of the specific devices or overall functionality of the multiprocessor system. In the specific example in the chart of FIG. 4, functions are described that are specific to a multiprocessor system used to implement communications and networking For example, entry 462 corresponds to a device to implement a networking engine, entry 464 corresponds to a device to implement a packet ordering engine, entry 466 corresponds to a message station device, entry 468 corresponds to a dynamic memory access (DMA) engine, entry 470 corresponds to a security engine, and entry 472 corresponds to a compression/decompression engine. Of course, the current approach can be applied to multiprocessor systems that are also directed to other purposes as well.

Figure 5:
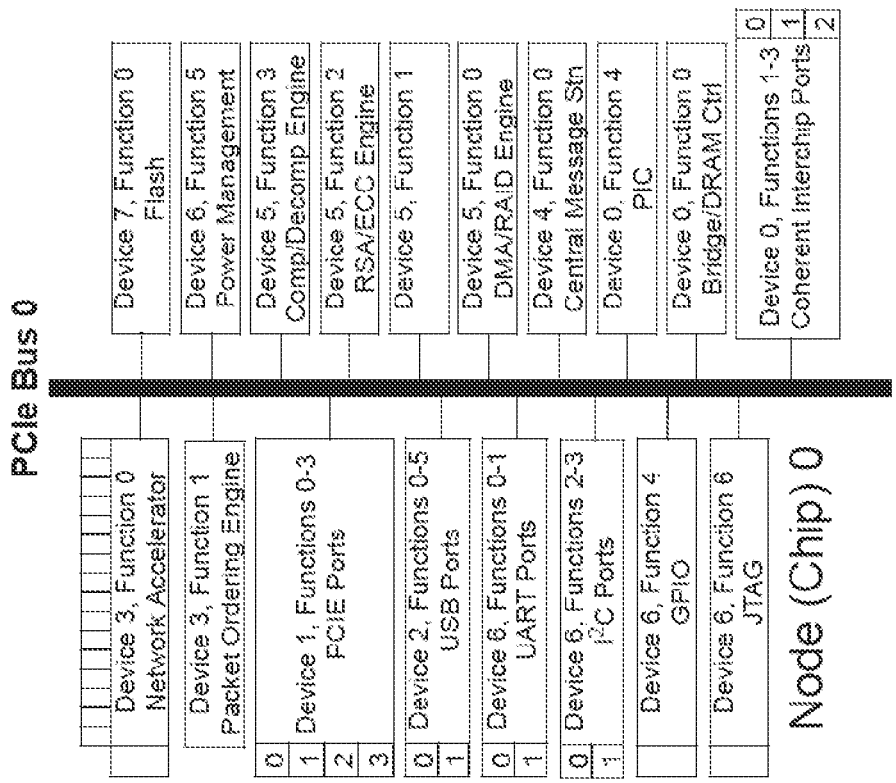
FIG. 5 illustrates devices associated with a processor core that are represented as PCIe devices according to some embodiments.

FIG. 5 visually illustrates how the combination of bus number, device number, and function number from chart 402 maps to PCIe devices for an example processor node. In particular, each device is viewed as a PCIe device on the PCI bus 0, which can then be accessed according to its device identifier. The example of FIG. 5 illustrates the devices for processor node 0, which pertains to device number 0-device number 7. For each of the other processor nodes, a similar illustration can be drawn with the specific device numbers for those nodes.

Figure 6:
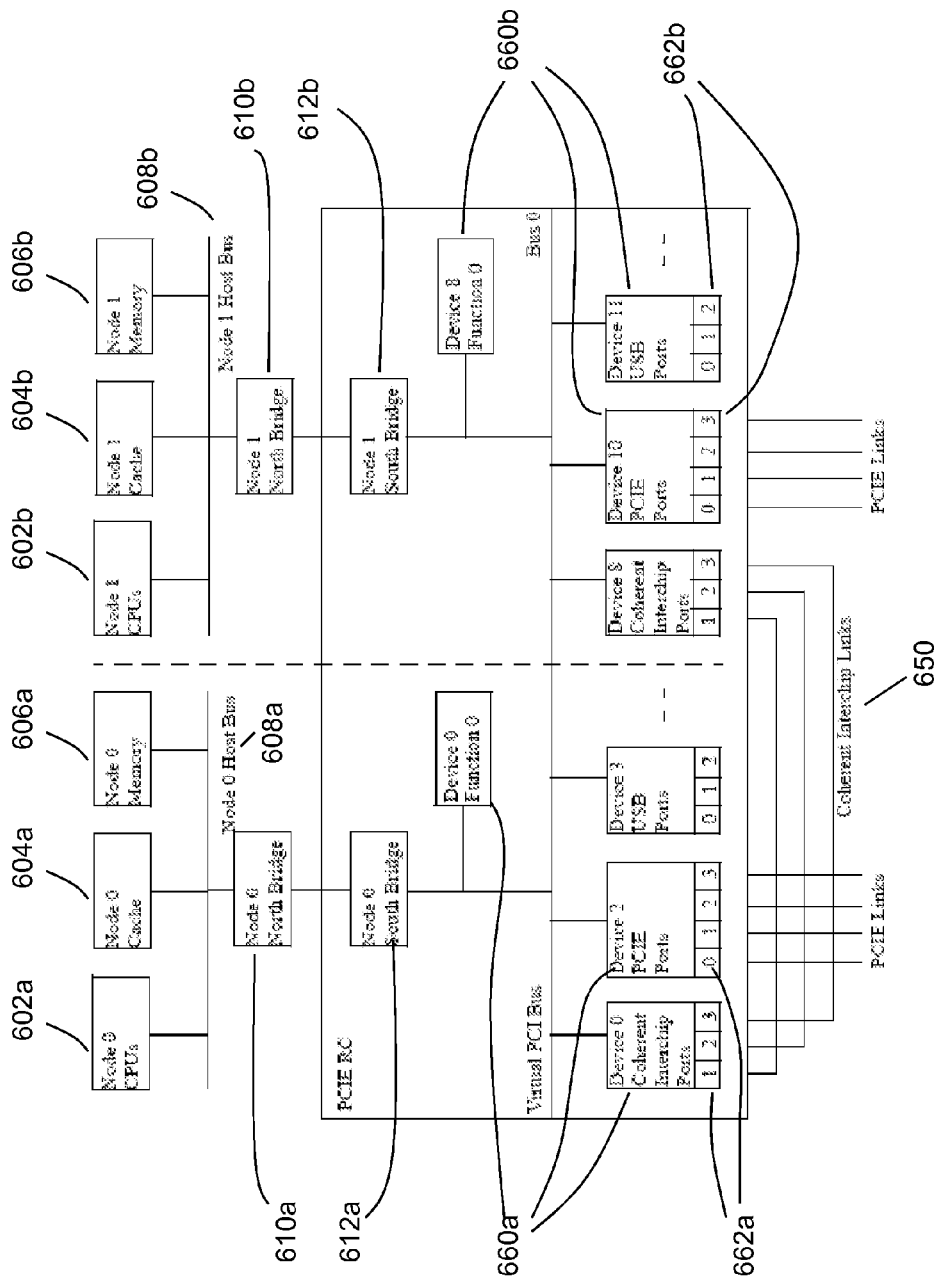
FIG. 6 illustrates an architecture for representing devices associated with a processor core as PCIe devices according to some embodiments.

FIG. 6 illustrates an architectural model that results from the above approach of configuring devices in a multiprocessor system in accordance with some embodiments. This figure shows two of the processor nodes in an example system, e.g., processor node 0 and processor node 1. Processor node 0 is represented on the left portion of this figure and processor node 1 is represented on the right side of this figure.

Each of the devices for the processor nodes 0 and 1 is viewed as a PCIe device on the common virtual PCI bus (Bus 0). For node 0, devices 660a are represented as attached to the PCI bus 0 using the combination of the bus number (bus 0), function numbers 662a, and the device numbers assigned to node 0 (device numbers 0, 2, and 3 for the devices shown in this figure). Similarly, for node 1, devices 660b are represented as attached to the virtual PCI bus 0 using the combination of the bus number (bus 0), function numbers 662b, and the device numbers assigned to node 1 (device numbers 8, 10, and 11 for the devices shown in this figure). With reference to the chart 402 shown in FIG. 4, these device numbers would correspond to coherent interchip ports for device number 0, PCIe ports for device number 2, and USB ports for device number 3.

While this common PCI bus 0 is shown as extending across both nodes 0 and 1, it is noted that this is a virtual PCI bus rather than a single physical bus. Coherent interchip links 650 exist to provide a communications channel between these two nodes.

Internally, each node includes its own host bus (or other interconnection) to communicate between the internal components of the processor nodes. Here, host bus 608a is used to provide internal communications for node 0 between the node 0 CPU(s) 602a, node 0 cache 604a, node 0 memory 606a, and the node 0 PCIe RC. A first bridge 610a and a second bridge 612a are used to communicate between the host bus 608a and the PCIe RC. Similarly, host bus 608b is used to provide internal communications for node 1 between the node 1 CPU(s) 602b, node 1 cache 604b, node 1 memory 606b, and the node 1 PCIe RC. A first bridge 610b and a second bridge 612b are used to communicate between the host bus 608b and the PCIe RC.

In operation, the PCIe interface connects internally to the multiprocessor system through a station on the I/O interconnect and a station on a messaging network. Accesses are performed by either direct access or through a message-based access. With a direct access, the CPU reads or writes to a defined memory address space range. An internal memory bridge detects the read or write request, forwarding the transaction to the PCIe controller, which generates the appropriate PCIe signaling to the required destination. The message-based approach may also be used, where messaging is performed through the PCIe controllers to communicate across the interchip links to complete transactions to and from the PCIe devices.

The interrupt behavior of the PCIe interface is integrated into the multiprocessor system's interrupt-handling system, which provides delivery to the different processor nodes and/or to specific cores/threads within the processor nodes. The PCIe controller reports interrupts detected by each link. Interrupts are signaled through the virtual wire concept of the PCIe, where in-band messages carry interrupt information or by assertion of dedicated PCIe interrupt pins.

The device identifier is used to provide internal configuration register access, where the combination of the bus number, device number, and function number that identifies the PCIe controller's own configuration space results in an internal configuration register access. The read or write command effectively reads or writes the on-chip configuration registers.

Therefore, what has been described is an improved approach for configuring devices for a multiprocessor system, where the devices pertaining to the different processors are viewed as connecting to a (virtual) standardized common bus. Regardless of the specific processor to which a device is directed connected, that device can be generally identified and accessed along the standardized common bus. PCIe is a suitable standardized bus type that can be employed, where the devices for each processor node are represented as PCIe devices. Therefore, in this embodiment, each of the devices would appear to the system software as a PCIe device. A PCIe controller can then be used to access the device by referring to the appropriate device identifier. This permits any device to be accessed on any of the processor nodes, without requiring separate and individualized configurations or drivers for each separate processor node.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

The invention claimed is:

1. A method for configuring devices in a multiprocessor system, comprising:
    discovering, by a master processor node of the multiprocessor system, a plurality of devices associated with a plurality of slave processor nodes of the multiprocessor system, wherein the master processor node communicates with each of the plurality of slave processor nodes via an interchip protocol; and
    associating each of the plurality of devices with a corresponding device identifier, wherein each of the plurality of devices is accessible via the master processor node using the corresponding device identifier on a common virtual bus that corresponds to a bus protocol, and wherein the bus protocol is different than the interchip protocol.

2. The method of claim 1, wherein the bus protocol is a PCIe bus protocol.

3. The method of claim 1, further comprising scanning the plurality of devices to identify functions associated with the plurality of devices.

4. The method of claim 1, wherein the device identifier comprises a bus number, a device number, and a function number.

5. The method of claim 4, wherein the bus number corresponds to the common virtual bus, the device number corresponds to a specific slave processor node, and the function number corresponds to a function of a device.

6. The method of claim 1, wherein the common virtual bus is a virtual PCIe bus.

7. The method of claim 1, wherein each of the plurality of processor nodes corresponds to a same set of associated devices.

8. The method of claim 1, wherein at least one slave processor node of the plurality of slave processor nodes corresponds to a communication processor.

9. The method of claim 1, wherein the device identifier corresponds to an on-chip interrupt address.

10. The method of claim 1, wherein the plurality of devices comprises I/O devices, memory devices, and/or accelerator devices.

11. The method of claim 1, wherein the device identifier is pre-assigned prior to discovery of the plurality of devices.

12. A method for accessing devices in a multiprocessor system, comprising:
    determining, by a master processor node of the multiprocessor system, a device identifier that corresponds to a device from among a plurality of devices associated with a plurality of slave processor nodes of the multiprocessor system, wherein the master processor node communicates with the plurality of slave processor nodes via an interchip protocol and the plurality of devices are associated with a bus protocol different than the interchip protocol; and
    accessing the device using the device identifier, where the device identifier provides access to the device on a common virtual bus that corresponds to the bus protocol.

13. The method of claim 12, wherein the bus protocol is a PCIe bus protocol.

14. The method of claim 12, wherein the device identifier comprises a bus number, a device number, and a function number.

15. The method of claim 14, wherein the bus number corresponds to the common virtual bus, the device number corresponds to a specific slave processor node, and the function number corresponds to a function of a device.

16. The method of claim 12, wherein the common virtual bus is a virtual PCIe bus.

17. The method of claim 12, wherein at least one slave processor node of the plurality of slave processor nodes corresponds to a communication processor.

18. The method of claim 12, wherein the plurality of devices comprises I/O devices, memory devices, and/or accelerator devices.

19. A system for configuring devices for a multiprocessor system, comprising:

a plurality of processor nodes that communicate via an interchip protocol; and a plurality of devices, each of the plurality of devices associated with a processor node of the plurality of processor nodes and configured to be discoverable as being associated with a bus protocol and to be accessible via a corresponding device identifier on a common virtual bus that corresponds to the bus protocol, wherein the bus protocol is different than the interchip protocol.

20. The system of claim 19, wherein the bus protocol is a PCIe bus protocol.

21. The system of claim 19, wherein the device identifier comprises a bus number, a device number, and a function number.

22. The system of claim 21, wherein the bus number corresponds to the common virtual bus, the device number corresponds to a specific processor node, and the function number corresponds to a function of a device.

23. The system of claim 19, wherein the common virtual bus is a virtual PCIe bus.

24. The system of claim 19, wherein each of the plurality of processor nodes corresponds to a same set of associated devices.

25. The system of claim 19, wherein at least one processor node of the plurality of processor nodes corresponds to a communication processor.

26. The system of claim 19, wherein the device identifier corresponds to an on-chip interrupt address.

27. The system of claim 19, wherein the plurality of devices comprises I/O devices, memory devices, and/or accelerator devices.

28. The system of claim 19, wherein the device identifier is pre-assigned prior to discovery of the plurality of devices.

29. A system for accessing devices in a multiprocessor system, comprising:

a plurality of devices associated with a plurality of processor nodes of the multiprocessor system, in which a respective device identifier corresponds to each of the plurality of devices and in which the plurality of processor nodes communicate via an interchip protocol; and a common virtual bus relating to a bus protocol that is associated with the plurality of devices, in which the bus protocol is different than the interchip protocol, and in which the plurality of devices is accessible on the common virtual bus using the respective device identifiers.

30. The system of claim 29, wherein the bus protocol is a PCIe bus protocol.

31. The system of claim 29, wherein the respective device identifier comprises a bus number, a device number, and a function number.

32. The system of claim 31, wherein the bus number corresponds to the common virtual bus, the device number corresponds to a specific processor node, and the function number corresponds to a function of a device.

33. The system of claim 29, wherein the common virtual bus is a PCIe bus.

34. The system of claim 29, wherein at least one processor node of the plurality of processor nodes corresponds to a communication processor.

35. The system of claim 29, wherein the plurality of devices comprises I/O devices, memory devices, and/or accelerator device.

* * * * *